(12) United States Patent
Carvalho et al.

(10) Patent No.: US 11,257,404 B2
(45) Date of Patent: Feb. 22, 2022

(54) MOTOR VEHICLE CONTROL DEVICE AND METHOD FOR MANUFACTURING A MOTOR VEHICLE CONTROL DEVICE

(71) Applicant: BCS AUTOMOTIVE INTERFACE SOLUTIONS GMBH, Radolfzell (DE)

(72) Inventors: Nelson Carvalho, Aach (DE); Pawel Borowczyk, Czestochowa (PL); Steffen Sornberger, Hilzingen/Twiefeld (DE); Helmut Sowig, Villingen-Schwenningen (DE); Viktor Beliuzhenko, Constance (DE); Leandro Conde, Singen (DE)

(73) Assignee: BCS AUTOMOTIVE INTERFACE SOLUTIONS GMBH, Radolfzell (DE)

( * ) Notice: Subject to any disclaimer, the term of this patent is extended or adjusted under 35 U.S.C. 154(b) by 118 days.

(21) Appl. No.: 16/623,875

(22) PCT Filed: Jun. 20, 2018

(86) PCT No.: PCT/EP2018/066370
§ 371 (c)(1),
(2) Date: Dec. 18, 2019

(87) PCT Pub. No.: WO2018/234361
PCT Pub. Date: Dec. 27, 2018

(65) Prior Publication Data
US 2021/0138905 A1 May 13, 2021

(30) Foreign Application Priority Data
Jun. 21, 2017 (DE) .................. 10 2017 113 662.2

(51) Int. Cl.
*B60K 37/06* (2006.01)
*G09F 13/04* (2006.01)
*G09F 21/04* (2006.01)

(52) U.S. Cl.
CPC .............. *G09F 13/04* (2013.01); *B60K 37/06* (2013.01); *G09F 21/04* (2013.01); *G09F 21/049* (2020.05);
(Continued)

(58) Field of Classification Search
CPC ........ G09F 13/04; G09F 21/04; G09F 21/049; G09F 13/044; G09F 13/0427;
(Continued)

(56) References Cited

U.S. PATENT DOCUMENTS 5,537,300 A * 7/1996 Kraines .................... B60Q 3/14
362/86
7,863,973 B2 1/2011 Ehrlich et al.
(Continued)

FOREIGN PATENT DOCUMENTS

DE 102007013078 A1 * 9/2008 .......... H03K 17/964
DE 102007013078 A1 9/2008
(Continued)

*Primary Examiner* — Fatima N Farokhrooz
(74) *Attorney, Agent, or Firm* — McNees Wallace & Nurick LLC

(57) ABSTRACT

There is described a motor vehicle control device (10) for an interior space of a motor vehicle, comprising a trim (12) and a printed circuit board (34), wherein the trim (12) comprises a control surface (14) on which at least one switching symbol (16) to be actuated is shown, which can be backlit by a light source, wherein the light source is associated to a light duct (22) which leads to the control surface (14), wherein the light emitted by the light source (44, 60) extends along the light duct (22) and backlights the at least one switching symbol (16) to be actuated. Furthermore, there is described a method for manufacturing a motor vehicle control device (10).

11 Claims, 8 Drawing Sheets

(52) U.S. Cl.
CPC .. *B60K 2370/332* (2019.05); *B60K 2370/336* (2019.05); *B60K 2370/34* (2019.05); *B60K 2370/345* (2019.05); *G09F 13/044* (2021.05); *G09F 13/0427* (2021.05)

(58) Field of Classification Search
CPC .............. B60K 37/06; B60K 2370/336; B60K 2370/332; B60K 2370/34; B60K 2370/345
See application file for complete search history.

(56) References Cited

U.S. PATENT DOCUMENTS

| | | | |
|---|---|---|---|
| 10,525,875 | B2 | 1/2020 | Kirilenko et al. |
| 2004/0213008 | A1 | 10/2004 | Bayersdorfer et al. |
| 2005/0195614 | A1* | 9/2005 | Bayersdorfer .......... G09F 13/22 362/545 |
| 2008/0259245 | A1* | 10/2008 | Mezouari .......... G02F 1/133603 349/64 |
| 2011/0175747 | A1 | 7/2011 | Small et al. |
| 2011/0187492 | A1* | 8/2011 | Newman ................. G05B 19/00 340/5.2 |
| 2012/0207977 | A1* | 8/2012 | Ditter ..................... B60K 37/06 428/156 |
| 2013/0258643 | A1 | 10/2013 | Helstern et al. |
| 2014/0081521 | A1* | 3/2014 | Frojdh ............... G01C 21/3664 701/36 |
| 2015/0210226 | A1* | 7/2015 | Topart ..................... B60Q 3/54 362/511 |
| 2018/0065547 | A1 | 3/2018 | Kirilenko et al. |

FOREIGN PATENT DOCUMENTS

| | | |
|---|---|---|
| DE | 202011110179 U1 | 7/2011 |
| DE | 102011077902 A1 | 12/2012 |
| DE | 202013011516 U1 | 12/2014 |
| DE | 102013018989 A1 | 5/2015 |
| DE | 102014019245 A1 | 6/2016 |
| DE | 102015201427 A1 | 7/2016 |
| FR | 2772695 A1 | 6/1999 |

* cited by examiner

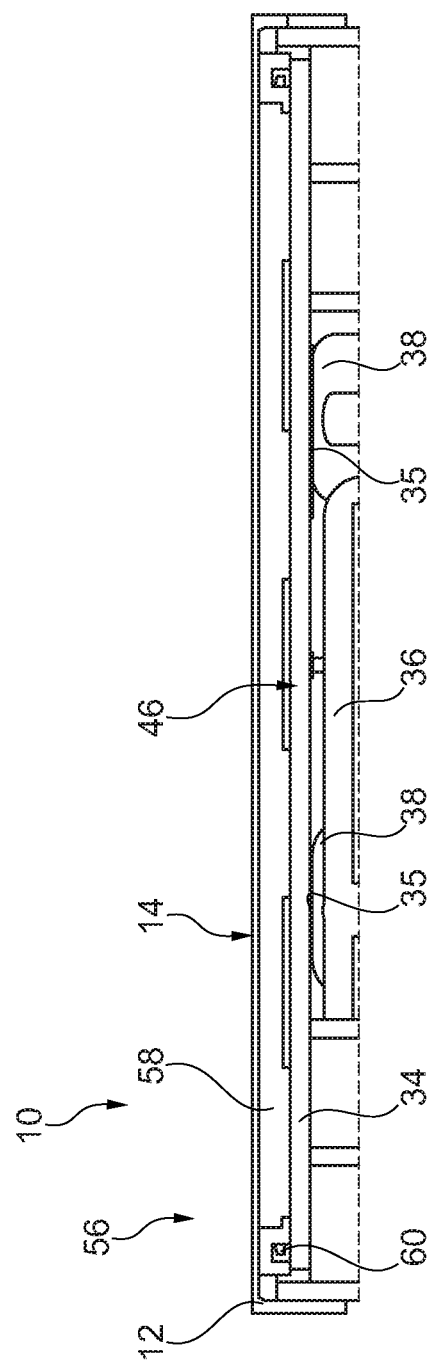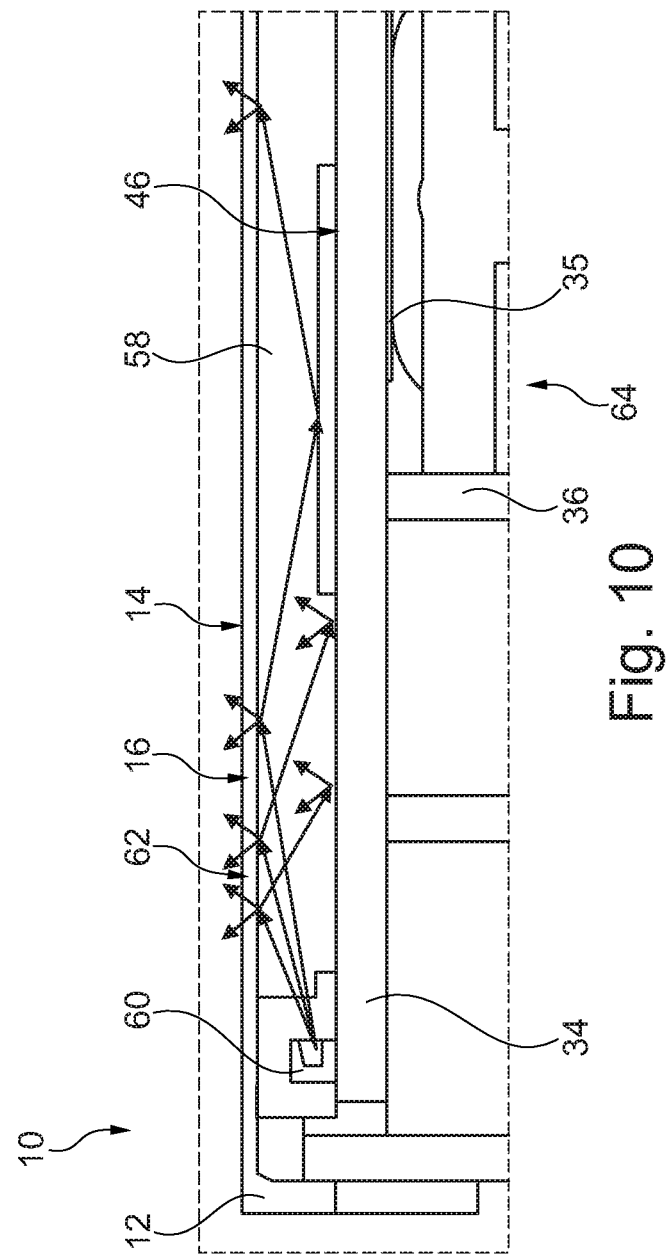

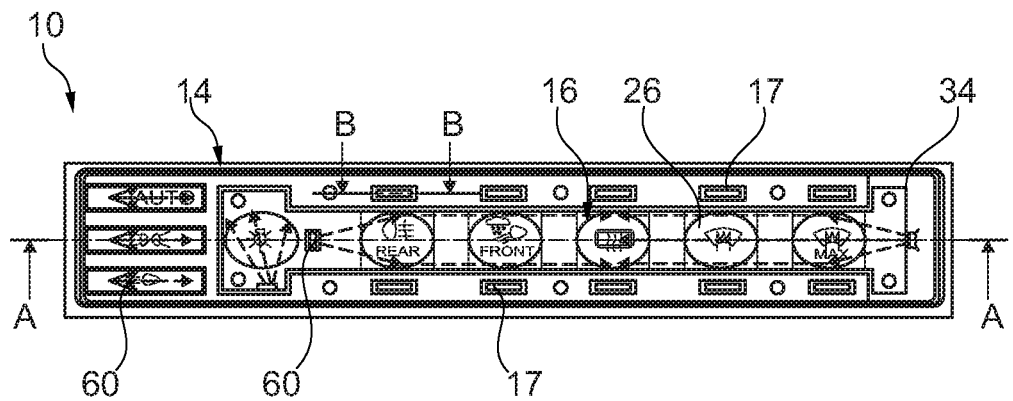
Fig. 12
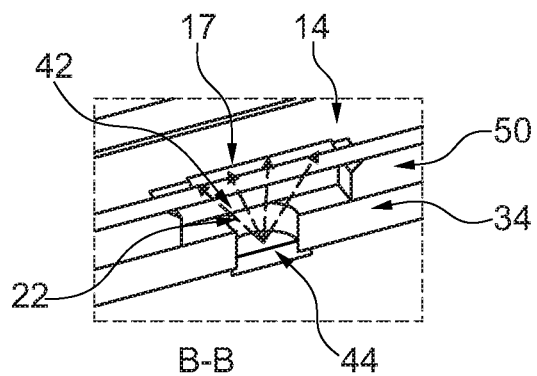
Fig. 15
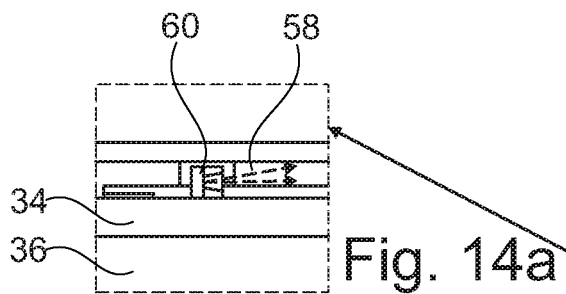
Fig. 14a
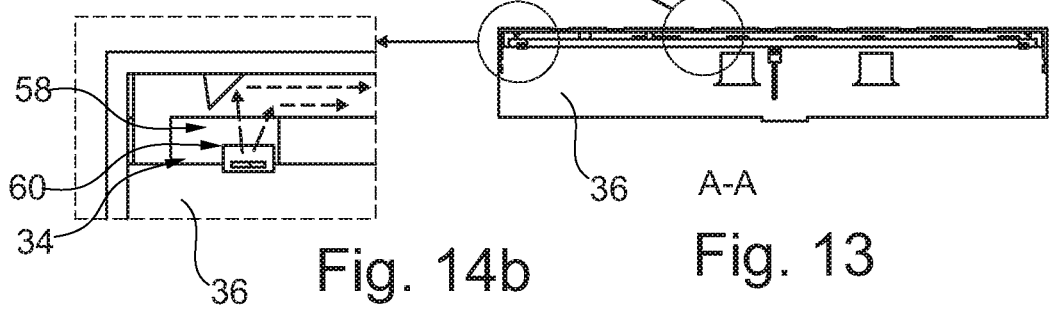
Fig. 14b
Fig. 13

MOTOR VEHICLE CONTROL DEVICE AND METHOD FOR MANUFACTURING A MOTOR VEHICLE CONTROL DEVICE

RELATED APPLICATIONS

This application filed under 35 U.S.C § 371 is a national phase application of International Application Number PCT/EP2018/066370, filed Jun. 20, 2018, which claims the benefit of German Application No. 10 2017113 82.2 filed Jun. 21, 2017, the subject matter of which are incorporated herein by reference in their entirety.

BACKGROUND

The Invention relates to a motor vehicle control device for an interior space of a motor vehicle and to a method for manufacturing a motor vehicle control device.

From the prior art, there are known motor vehicle control devices which are used in an interior space of the motor vehicle, by means of which a vehicle occupant can activate or deactivate certain functions of the motor vehicle, which also can be referred to as vehicle functions. For this purpose, the motor vehicle control devices usually include a control surface on which several switching symbols are arranged, which represent or graphically display the corresponding functions. The switching symbols to be actuated usually are backlit by a light source, so that the vehicle occupant easily can find the corresponding switching symbol also in the dark. Furthermore, it is known that the switching symbols themselves or light exit surfaces associated to the same are illuminated, in case the corresponding function is activated, in order to correspondingly indicate this to the vehicle occupant. To this end, there is usually provided an LED or other kind of light source, which is arranged on a printed circuit board, in order to illuminate the corresponding switching symbol or the light exit surface.

However, it was found to be disadvantageous that with a compact construction of the motor vehicle control device the illumination is not complete, so that for example the edges of the switching symbols are not illuminated.

SUMMARY

It is the object of the invention to provide a motor vehicle control device to be manufactured at low cost, which provides for a complete illumination of the switching symbols.

According to the invention, this object is solved by a motor vehicle control device for an interior space of a motor vehicle, comprising a trim and a printed circuit board, wherein the trim comprises a control surface on which at least one switching symbol to be actuated is shown, which can be backlit by a light source, wherein the light source is associated to a light duct which leads to the control surface, wherein the light emitted by the light source extends along the light duct and backlights the at least one switching symbol to be actuated.

It Is the idea underlying the invention that the light emitted by the light source has a larger distance to the control surface, as it is guided through a light duct, whereby the corresponding light beams can flare within the light duct, in order to completely illuminate the associated switching symbol. Due to the light duct it nevertheless is possible that the motor vehicle control device is of compact construction, as the light duct can be formed within a structure which is required for the operation of the motor vehicle control device. Accordingly, it is not necessary to use any additional components, in order to artificially produce a distance.

According to one embodiment, the printed circuit board has a front side directed to the control surface and a rear side opposite to the front side, wherein the light source is arranged on the rear side of the printed circuit board which includes an associated opening that forms the light duct. Correspondingly, the light source is arranged on the rear side of the printed circuit board, so that it shines through the printed circuit board itself, in particular the corresponding hole or the corresponding opening, in order to backlight the control surface associated to the front side of the printed circuit board. The thickness of the printed circuit board represents the light duct, due to which the light impinges on the corresponding switching symbol with an increased distance to the switching symbol, in order to illuminate the same completely.

According to one aspect, the light duct is formed on alight duct module formed separate from the trim and printed circuit board, through which the light duct extends. The light duct module ensures that to each of the several switching symbols on the control surface a corresponding light source is associated, so that the individual switching symbols can be backlit. At the same time, the light duct module forms a light seal, so that the emitted light does not illuminate adjacent switching symbols. The individual light ducts accordingly are formed separate from each other. In particular, a corresponding light duct is associated to a potential switching symbol. Moreover, to each light duct at least one light source is associated, in particular several light sources which emit light in different colors.

In particular, the light duct module has at least one electrically conductive portion which comprises a sensor surface associated to the switching symbol, in particular wherein the sensor surface encloses the light duct. Correspondingly, the light duct module at the same time forms the sensor surface necessary for the operation or actuation. Together with the control surface the sensor surface can form a capacitive sensor by which an approach to or touch of the control surface can be detected, in particular of a switching symbol represented on the control surface. Alternatively, the approach or touch sensor can be formed by the sensor surface alone, so that a self-capacitive approach or touch sensor is present.

The light duct can be formed on a light duct module which is formed separate from the trim and the printed circuit board and which includes a base body through which the light duct extends in its entirety. The light duct module can comprise at least one electrically conductive portion which also completely extends through the base body and comprises a sensor surface associated to the switching symbol.

According to a particular embodiment the at least one sensor surface has a sensor associated thereto, which detects an approach to, touch and/or actuation of the associated switching symbol, in particular wherein the sensor is activatable. The sensor can be a capacitive or piezoelectric sensor. The number of sensors is defined via the number of light ducts present in the light duct module, wherein the sensors are activated in dependence on the switching symbols provided on the trim. This means that the corresponding electrically conductive portions can be enabled subsequently, for example via a control unit and/or a software update, so that a larger functionality is provided.

The trim can exchangeably be mounted on the light duct module. It thereby is possible that different trims can be mounted on the corresponding light duct module, in case for example another functionality is desired. A first trim can comprise less switching symbols than a second trim, wherein via a control unit and the light duct module the corresponding additional functions, which are associated to the additional switching symbols, can be enabled subsequently. For this purpose, the electrically conductive portions with the corresponding sensor surfaces are enabled and the light source(s) associated to the light ducts correspondingly is/are taken into account in the actuation, so that the switching symbols additionally present on the trim are illuminated.

According to one aspect the light duct can be formed such that the light is totally reflected on the inner surfaces. This ensures that the illumination of the switching symbol is correspondingly good, as the light emitted by the light source substantially completely serves the illumination of the switching symbol. Due to the total reflection of the inner surfaces of the light duct it also is ensured that the switching symbol is backlit substantially homogeneously.

Alternatively or in addition, alight guide can be provided in the light duct, which has a total reflection on its boundary surface. It also is ensured thereby that the switching symbol associated to the light duct is illuminated completely.

Another aspect provides function display surfaces on the control surface, via which a status of an associated function can be indicated. The function display surfaces are surfaces which usually are illuminated, in case an associated function is activated. Alternatively, a deactivated function can be represented thereby, in case the deactivated function corresponds to a status unusual as compared to the normal status, for example to a passenger airbag switched off. To the corresponding function display surfaces function light sources in turn are associated. For example, these are LEDs which are multicolored, so that a function display surface can be illuminated in different colors. Alternatively, several LEDs can be associated to a function display surface, which each emit a different color, wherein only one LED each is actuated. The colors in general can be red, orange and/or green, in order to indicate a corresponding function in color.

According to another aspect, the motor vehicle control device includes a search illumination which comprises at least one search illumination light source and an associated light guide. Via the search illumination light source a plurality of associated areas of the control surface can be illuminated correspondingly.

The areas can be the switching symbols which are backlit, in order to form the search illumination. The vehicle occupant thus can find the corresponding switching symbols more quickly in the dark.

Alternatively, the areas which are associated to the search illumination can be separately formed search illumination display surfaces, which correspondingly are formed on the control surface, in order to provide guidance to the vehicle occupants.

The light guide in particular is formed such that the light transmitted through the light guide is totally reflected on its boundary surfaces, wherein the light guide includes exit surfaces on which the light can exit. The exit surfaces correspond with those areas on which the corresponding search illumination is meant to exit, in order to be seen by the vehicle occupant. As otherwise a total reflection is present, it is ensured that a particularly efficient search illumination is present.

Furthermore, the invention provides a method for manufacturing a motor vehicle control device, in particular a motor vehicle control device as mentioned above, comprising the following steps:

providing a printed circuit board on which at least one light source is provided, providing a trim carrier of modular construction, selecting one of several trims which can be coupled with the trim carrier of modular construction, and mounting the selected trim on the trim carrier, wherein the printed circuit board or the trim carrier comprises at least one light duct associated to the light source.

Accordingly it is possible that the motor vehicle control device is adapted to desired conditions in a simple way, as another trim is coupled to the corresponding trim carrier, which has more or less switching symbols that can be activated by the vehicle occupant. Furthermore, a modular motor vehicle control device thus is formed, which can be used at several sites of use, for example as light island or as control area for further functions, wherein only the trim must be exchanged. This correspondingly reduces the manufacturing costs for the interior furnishings of a motor vehicle. Retrofitting also is possible in a simple way, in case a function is to be enabled subsequently, as for this purpose merely the trim must be exchanged and the corresponding function must be enabled in a control unit.

By exchanging the trim, it is possible to enable corresponding sensors of the motor vehicle control device so that not only an exchange of decorative elements is involved.

According to one aspect the trim carrier is formed by a light duct module or a base module. In case the trim carrier is formed by the light duct module, the trim carrier includes the light duct associated to the light source. In case the trim carrier is formed by a base module on which the trim is mounted, the printed circuit board can include the corresponding light duct via an opening, in case the corresponding light source is arranged on the rear side of the printed circuit board.

According to another aspect provided sensors are enabled, which are associated to switching symbols that are provided on a control surface of the trim. Correspondingly, the sensors are enabled corresponding to the number of switching symbols, in order to recognize an operation or actuation of the corresponding switching symbols on the control surface. In particular, it thereby is possible that additional functions are activated subsequently, which are carried out via an exchange of the trim and corresponding enabling of the functions, in particular sensors. For example, an electrically conductive portion associated to the enabled function is activated or enabled in the light duct module.

DESCRIPTION OF THE DRAWINGS

Further advantages and properties of the invention can be taken from the following description and the drawings to which reference is made. In the drawings:

FIG. 9 shows a second sectional view of the motor vehicle control device according to FIG. 6, FIG. 10 shows a detail view of FIG. 9, FIG. 12 shows a partly transparent top view of the motor vehicle control device according to FIG. 11, FIG. 13 shows a sectional representation through the motor vehicle control device according to FIG. 12 along the sectional line A-A, FIG. 14a shows a detail view of FIG. 13, FIG. 14b shows a further detail view of FIG. 13, and FIG. 15 shows a sectional representation through the motor vehicle control device according to FIG. 12 along the sectional line B-B.

DETAILED DESCRIPTION

Figure 1:
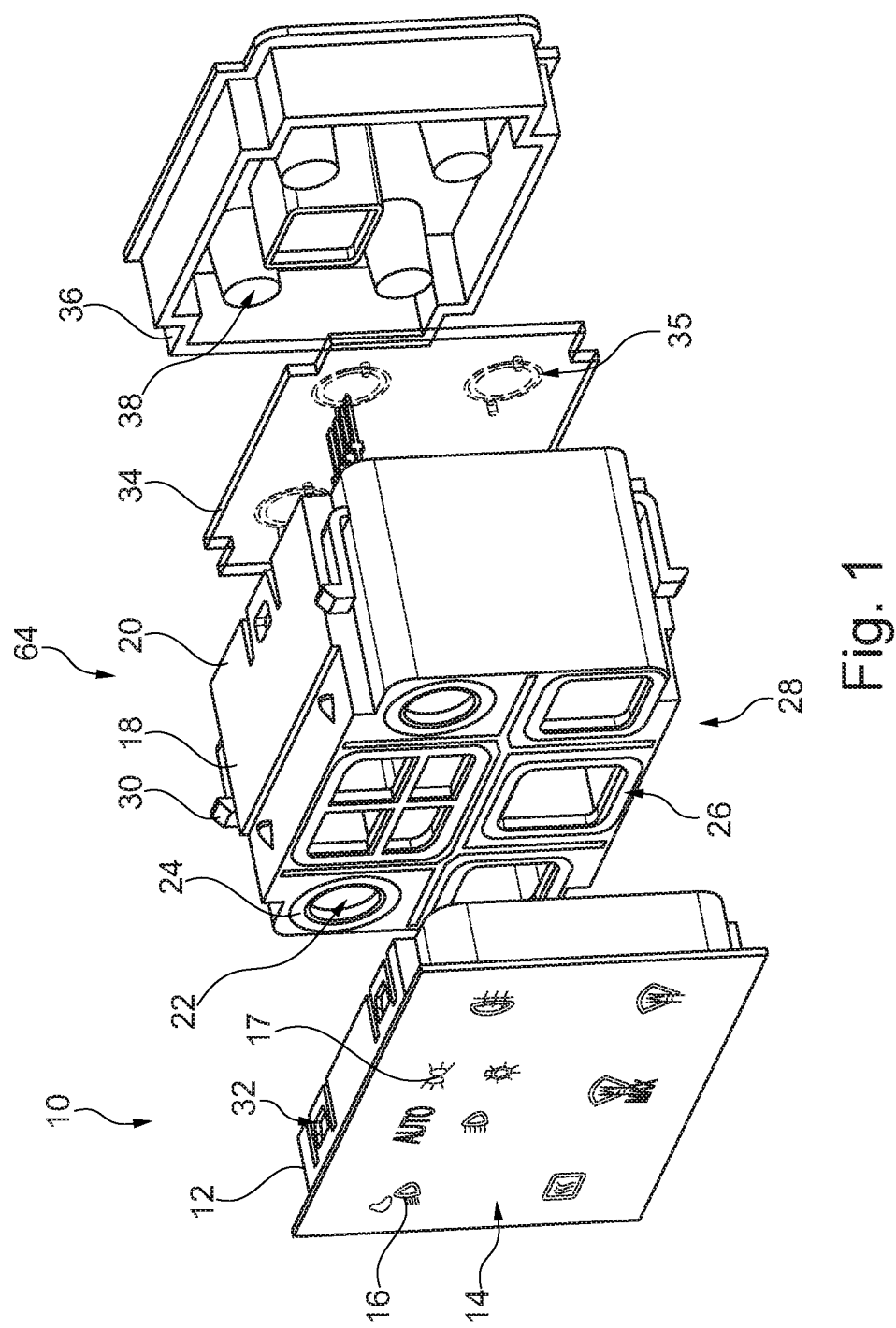
FIG. 1 shows an exploded view of a motor vehicle control device of the invention according to a first embodiment.

FIG. 1 shows a motor vehicle control device 10 which can be used for an interior space of a motor vehicle, for example as a light island.

The motor vehicle control device 10 comprises a trim 12 which includes a control surface 14 on which several switching symbols 18 are shown, which can be actuated by a vehicle occupant, in order to activate or deactivate a vehicle function.

Beside the switching symbols 16 function display surfaces 17 can also be provided, via which no vehicle function can be switched as such, but only the status of the corresponding vehicle function is indicated. In general, the function display surfaces 17 can however also be represented by a switching symbol 16.

In the illustrated embodiment, the trim 12 is associated to a light duct module 18 which comprises a base body 20 in which several light ducts 22 are formed. The light ducts 22 extend completely through the base body 20, so that they each comprise two opposite open ends.

Furthermore, the light duct module 18 has electrically conductive portions 24 which likewise extend completely through the base body 20. On the surface of the light duct module 18 directed to the trim 12 the electrically conductive portions 24 comprise a sensor surface 26 which is formed closed all around, wherein it encloses the correspondingly associated light duct 22 in a plane which for example corresponds to the end face of the light duct module 18.

The electrically conductive portions 24, in particular the sensor surfaces 26, together with the control surface 14 of the trim 12 can form capacitive sensors 28 which detect an approach to or touch of the control surface 14, in particular of a corresponding switching symbol 16.

Alternatively, the electrically conductive portions 24, in particular the sensor surfaces 26, can form self-capacitive sensors 28, in order to detect an approach to or touch of the control surface 14.

Furthermore, the light duct module 18 comprises several fastening elements 30, which in the illustrated embodiment are formed as spring elements. The fastening elements 30 cooperate with openings 32 in the trim 12, so that the trim 12 is releasably attached to the light duct module 18. It thereby is ensured that the trim 12 can be exchanged, in case this is desired, as will yet be explained below.

There is also provided a printed circuit board 34 on which in general several light sources are arranged, which in the illustrated embodiment are not shown, however, for reasons of clarity.

The printed circuit board 34 furthermore comprises a control and evaluation unit via which the electrically conductive portions 24 are coupled, so that the signals obtained from the electrically conductive portions 24 can be evaluated correspondingly.

Optionally, pressure sensors 35 can also be formed on the printed circuit board 34, via which a force correspondingly exerted on the control surface 14 can be detected. The pressure sensors 35 support on a base module 36, which therefor comprises correspondingly provided abutment surfaces 38.

In general, the base module 36 is provided to ensure a rear-side termination of the motor vehicle control device 10, so that the outer surfaces of the motor vehicle control device 10 are formed by the base module 36, the light duct module 18, in particular its side surfaces, and the trim 12, in particular the control surface 14. In the assembled condition of the motor vehicle control device 10 the printed circuit board 14 accordingly is arranged between the base module 36 and the light duct module 18 and correspondingly accommodated in a protected way.

Figure 2:
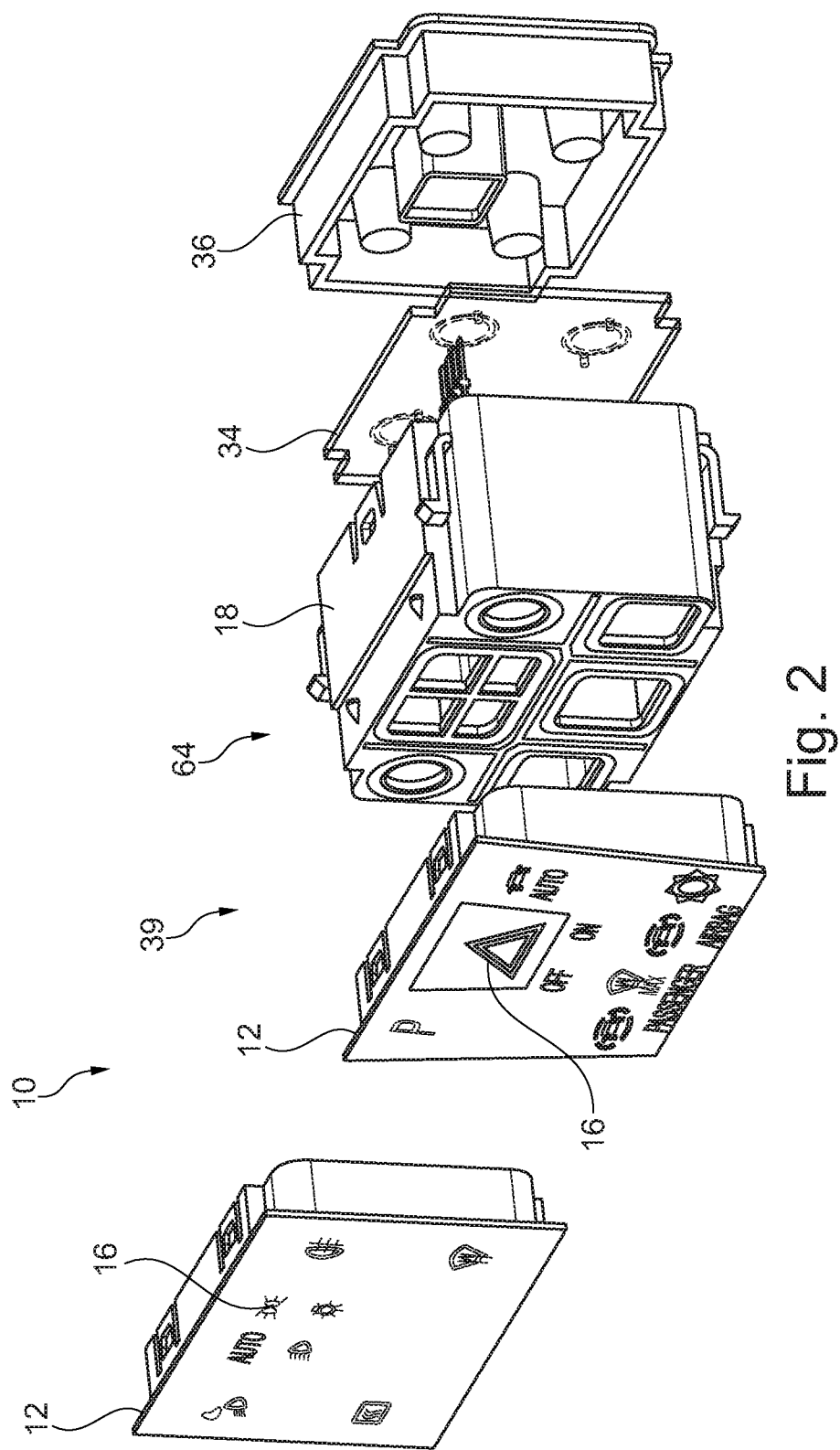
FIG. 2 shows an exploded view of the motor vehicle control device according to FIG. 1, in which an exchange of the trim is made.

As can be taken from FIG. 2, the trim 12 of the motor vehicle control device can be exchanged correspondingly, as the light duct module 18 is of modular construction. The light duct module 18 hence includes a modular interface 39 which is compatible with several trims 12, as is shown in FIG. 2.

On the two illustrated trims 12, which can be coupled with the light duct module 18, in particular via the modular interface 39, different switching symbols 16 are provided. Accordingly, the motor vehicle control device 10 can be used in the interior space of the motor vehicle in a variety of ways, for example as light island and as further control device.

In case they are coupled with the light duct module 18, the different switching symbols 16 however cover different light ducts 22 and hence different electrically conductive portions 24. This requires that the electrically conductive portions 24 associated to the switching symbols 16 correspondingly are activated or deactivated in the light duct module 18, in order to ensure the desired operability of the motor vehicle control device 10.

For example, in the left one of the two trims 12, in the upper region of the control surface 14, four switching symbols 16 are shown, whereas in the right one of the two trims 12 merely one single switching symbol 16 is shown, namely the corresponding warning signal. Thus, the associated electrically conductive portions 24 in the light duct module 18 must be associated to the desired function, i.e. be reprogrammed, which is effected in a simple way via the control and evaluation unit. The control and evaluation unit can be provided on the printed circuit board 34.

Figure 3:
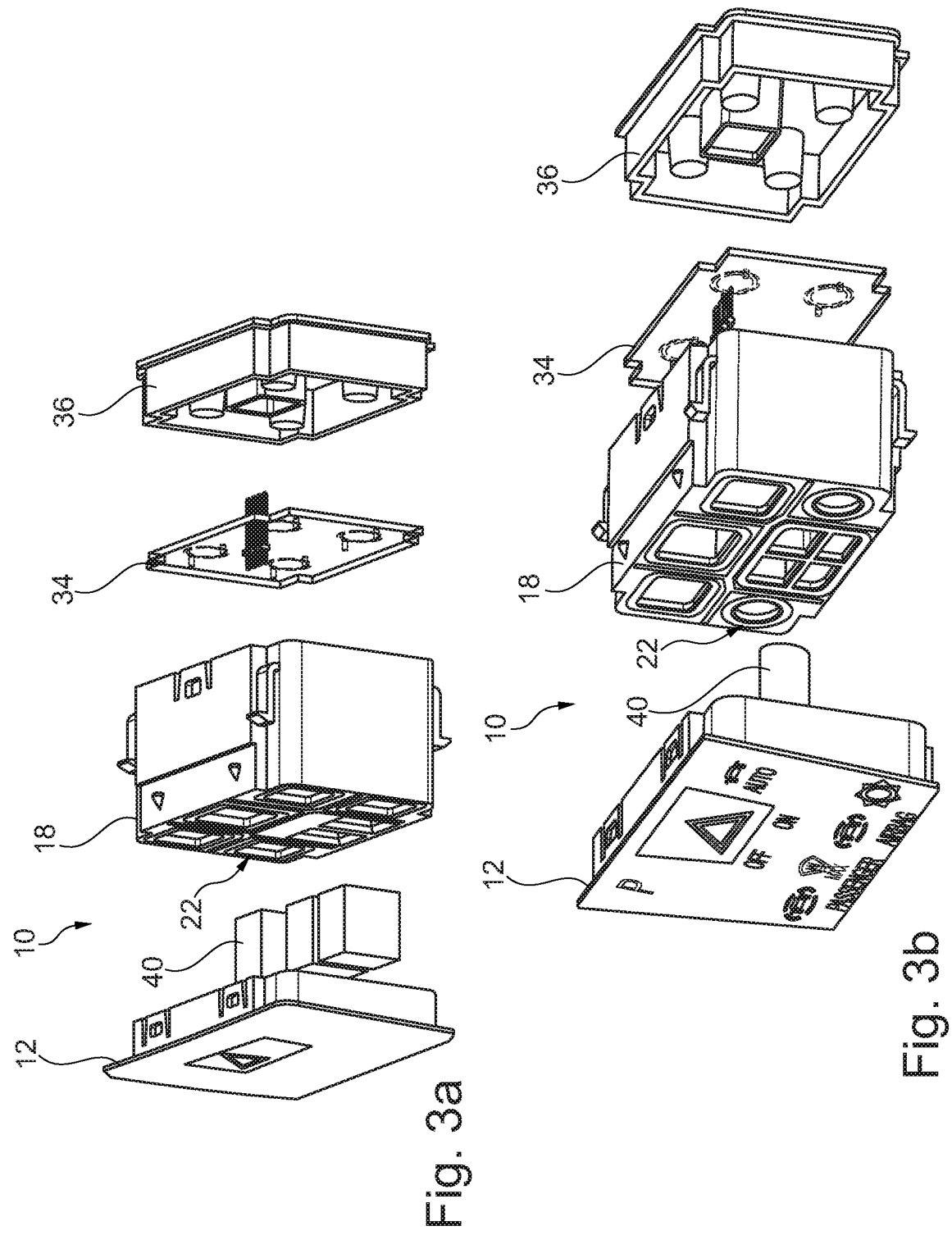
FIG. 3a shows the motor vehicle control device according to FIG. 1 with a first set of light guides.
FIG. 3b shows a motor vehicle control device according to the invention with a second light guides.

In FIGS. 3a and 3b it also is shown that in the respective light ducts 22 additional light guides 40 can be incorporated, via which a homogeneous illumination of the associated switching symbols 16 is achieved. For this purpose, the light guides 40 have a total reflection at their boundary surfaces. Alternatively, the light ducts 22 can be formed to be totally reflective on their inner sides, whereby a corresponding homogeneous illumination of the associated switching symbols likewise is achieved.

As can be taken from FIGS. 3a and 3b, the light ducts 22 in principle can have a different shape, for example rectangular or round.

Figure 4:
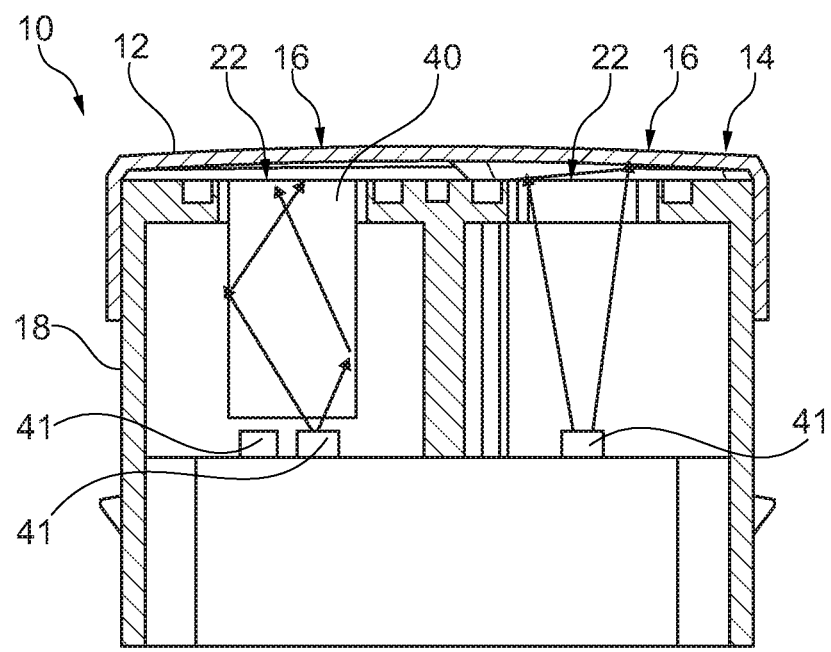
FIG. 4 shows a sectional representation of the motor vehicle control device according to FIG. 3b, FIGS. 5a to 5c show differently formed function display surfaces, which can be provided on a control surface of a motor vehicle control device according to the invention.

FIG. 4 shows a sectional representation through the motor vehicle control device 10, in particular two light ducts 22.

In the left light duct 22 a light guide 40 is provided, which ensures a total reflection on its boundary surfaces, in order to completely illuminate the associated switching symbol 16 on the control surface 14 of the trim 12 in a homogeneous way.

It also is shown that two light sources 41, for example LEDs, are associated to the left light duct 22. The two light sources 41 can emit light in a different wavelength or color, so that the associated switching symbol 16 can be backlit in at least two different colors.

To the right light duct 22 only one light source 41 is associated, which without light guide 40 completely illuminates the corresponding switching symbol 16, as the corresponding light duct 22 is provided.

Alternatively, it can be provided that the light duct 22 includes totally reflective inner surfaces, so that the light emitted by the light source 41 is completely reflected thereon.

Figure 5A:
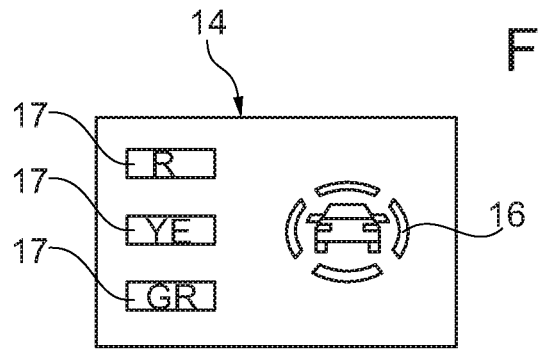
Figure 5B:
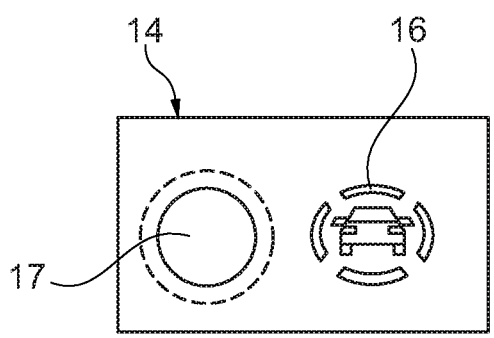
Figure 5C:
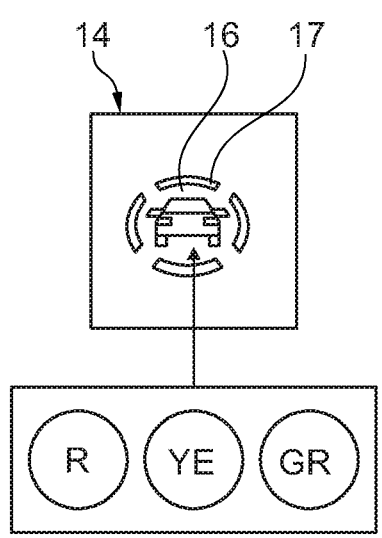

As explained already, function display surfaces 17 can also be provided on the control surface 14 beside the switching symbols 16, of which three different designs are shown in FIGS. 5a to 5c.

In FIG. 5a three function display surfaces 17 are associated to a switching symbol 16, to each of which a corresponding function light source is associated. This Is a red, yellow and green light source, for example LED, which illuminates the corresponding function display surface 17. An actuation of the switching symbol 16 accordingly results in that one of the three function display surfaces each lights up, in order to represent the corresponding function just activated or the status of the corresponding function.

FIG. 5b shows that merely one function display surface 17 is provided, which is associated to the switching symbol 16. The function display surface 17, however, can cooperate with a multicolored light source or with three different light sources, so that via the one function display surface 17 different colors can likewise be represented. Here as well, these are the colors red, yellow and green, which usually are employed to optically represent the status of functions.

FIG. 5c shows another alternative, in which the function display surface 17 at the same time coincides with the switching symbol 16. Correspondingly, the switching symbol 16 is backlit differently, in dependence on the corresponding status of the function. The switching symbol 16 likewise can be backlit in three different colors, the colors in turn being red, yellow and green. As soon as a vehicle occupant actuates the corresponding switching symbol 16, the switching symbol 16 correspondingly is backlit in another color.

Figure 6:
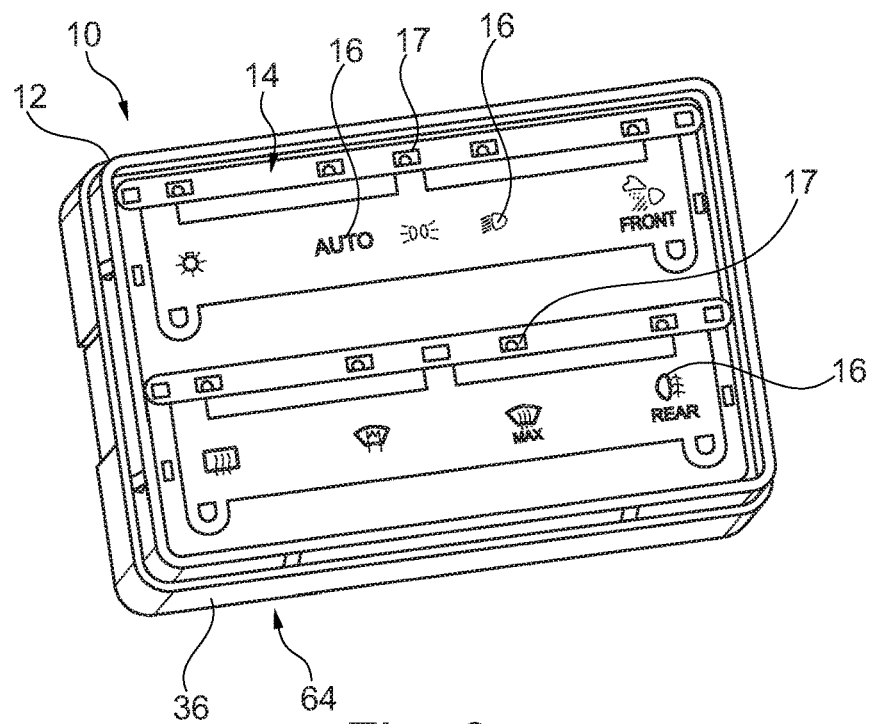
FIG. 6 shows a motor vehicle control device of the invention according to a second embodiment.
Figure 7:
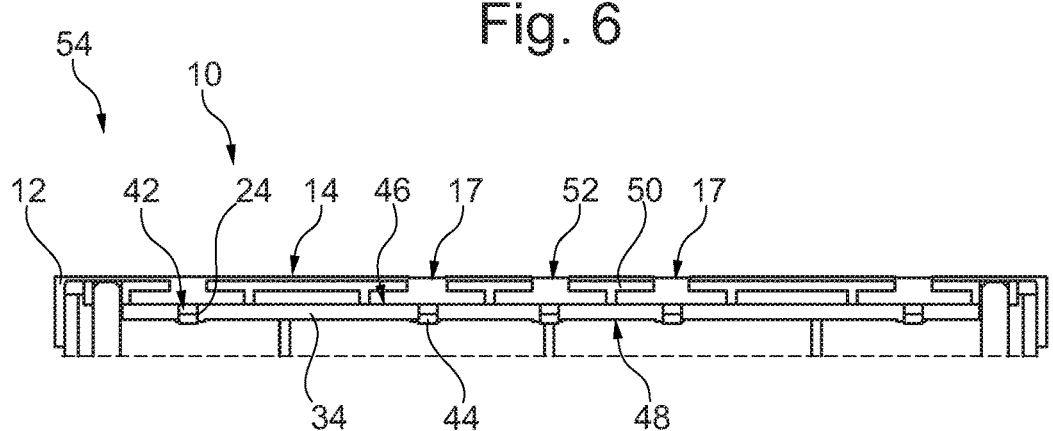
FIG. 7 shows a first sectional representation of the motor vehicle control device shown in FIG. 6.
Figure 8:
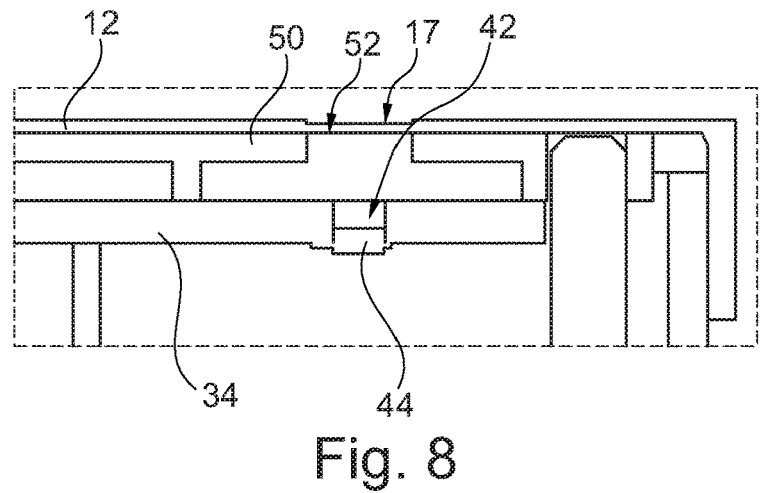
FIG. 8 shows a detail view of FIG. 7.

FIGS. 6 to 10 show a second embodiment of the motor vehicle control device 10, in which the light ducts 22 are formed by openings 42 in the printed circuit board 34, as is clearly illustrated in FIGS. 7 and 8.

The Figures also show that a corresponding light source 44 is mounted on the printed circuit board 34, wherein the printed circuit board 34 has a front side 46 which faces the control surface 14 of the motor vehicle control device 10, as well as a rear side 48 which is opposite to the front side 46.

The light source 44 is attached to the rear side 48, so that the light emitted by the same shines through the opening 42, i.e. the light duct 22. Thus, a larger spacing or distance is created between the light source 44 and the control surface 14, whereby a correspondingly homogeneous and complete illumination of a switching symbol 16 formed on the control surface 14 or of a function display surface 17 is ensured.

Furthermore, FIGS. 7 and 8 reveal that a light seal 50 is provided, in order to prevent shining over into adjacent regions. The light seal 50 includes corresponding recesses 42 which are associated to the function display surfaces 17 or switching symbols 16. The recesses 52 ensure that light can get to the function display surfaces 17 or to the switching symbols 16, in case the associated light source is activated.

FIGS. 7 and 8 show a function illumination 54 of the motor vehicle control device 10, i.e. an illumination which indicates the status of a corresponding function. This means that the light sources 44 are function light sources which are associated to the function display surfaces 17.

FIGS. 9 and 10 show another sectional plane of the motor vehicle control device 10 represented in FIG. 6, which reveals a search illumination 56 of the motor vehicle control device 10.

The search illumination 56 comprises a light guide 58 which is arranged between the printed circuit board 34 and the trim 12, i.e. between the front side 46 and the trim 12.

As can be taken from FIG. 10, the search illumination 56 comprises a search illumination light source 60 which laterally couples light into the light guide 58, so that the same extends completely through the light guide 58, in order to completely and homogeneously backlight the associated search illumination exit surfaces.

The search illumination exit surfaces for example are the switching symbols 16 which are backlit correspondingly via the search illumination 56, so that a vehicle occupant can find the same more quickly.

The light guide 58 in particular is formed such that the light transported through the same is totally reflected on the boundary surfaces, wherein corresponding exit surfaces 62 through which the light can exit are provided on the light guide 58. Accordingly, no total reflection occurs especially on the exit surfaces 62. The exit surfaces 62 are associated to the search illumination exit surfaces, in order to ensure corresponding backlighting of the corresponding areas.

Accordingly, the exit surfaces 62 in the light guide 58, on which the light is not totally reflected, are associated to the switching symbols 16, so that the same can be backlit correspondingly via the search illumination 56.

Furthermore, FIGS. 9 and 10 show the pressure sensors 35 as well as the associated abutment surfaces 38 which are formed by the base module 36.

Figure 11:
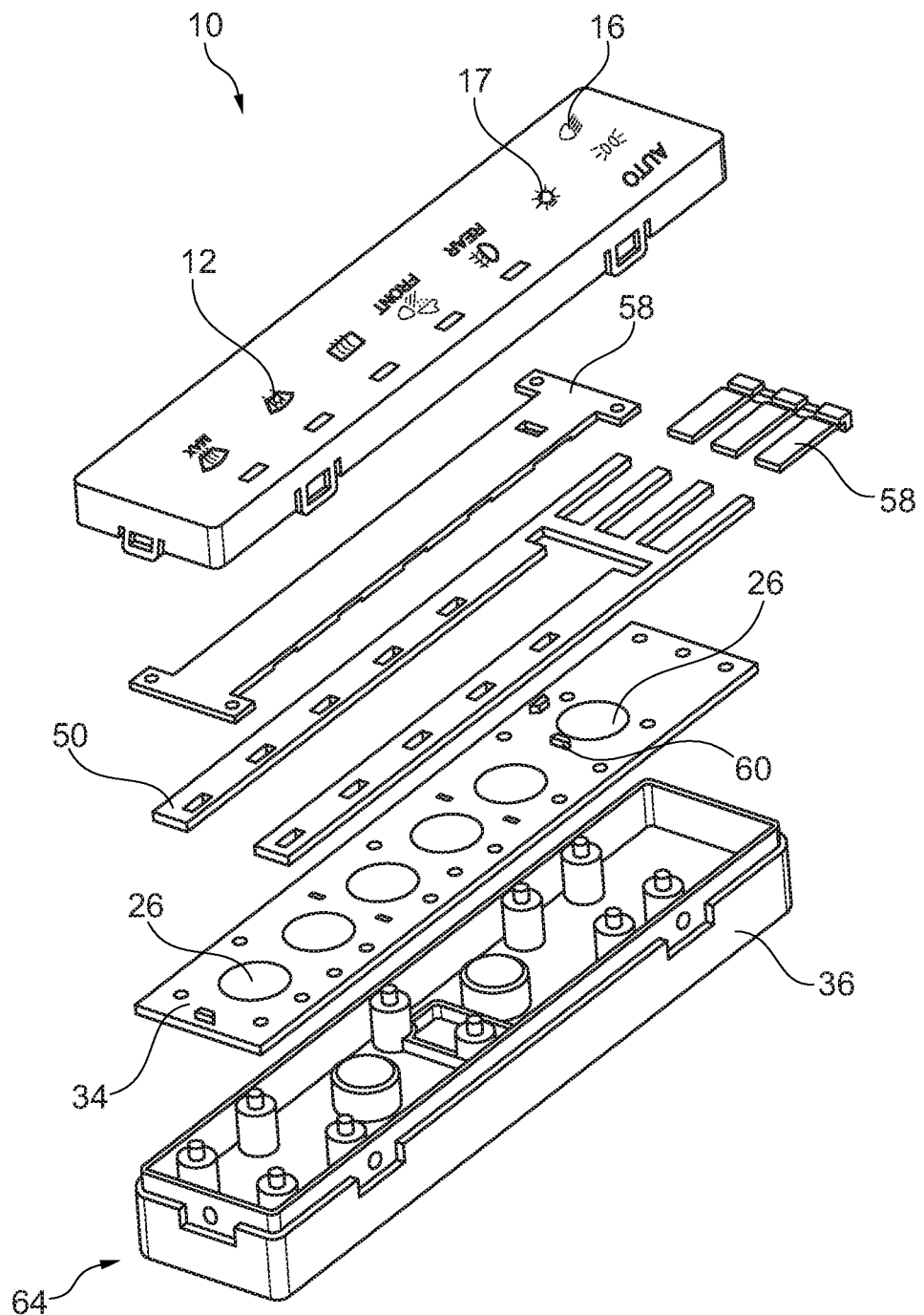
FIG. 11 shows an exploded view of a motor vehicle control device of the invention according to a third embodiment.

FIG. 11 shows a third embodiment of a motor vehicle control device 10 which is formed as a light strip. This motor vehicle control device 10 likewise comprises a trim 12 on which the control surface 14 is formed.

In essence, the third embodiment as shown in FIG. 11 differs from the second embodiment illustrated in FIGS. 6 to 10 to the effect that the switching symbols 16 as well as the function display surfaces 17 are arranged in a row, whereby the motor vehicle control device 10 has an oblong shape.

As can be taken from FIGS. 12 to 15, the light sources 44 associated to the function display surfaces 17 likewise are formed as so-called through-hole LEDs, so that the light emitted by the same extends through a corresponding light duct 22 which is formed by the printed circuit board 34, in particular an opening 42 in the printed circuit board 34.

For the search illumination 56 on the other hand, several search illumination light sources 60 in turn are provided, which laterally couple the light into an associated light guide 58.

In general, the light guides 58 can be formed of an optical silicone, so that they are correspondingly flexible and inexpensive and in addition have good light-guiding properties.

In particular, the light guides 58 are arranged between the trim 12 and the printed circuit board 34, wherein they are pressed due to their flexibility, in case a vehicle occupant actuates a switching symbol 16 provided on the trim 12. The light guides 58 can be formed such that with the pressure, i.e. the pressing of the light guide 58, the total reflection of the light guide 58 is eliminated, so that the light can leave the light guide 58 at the pressing point.

The trim 12 can consist of a two-component injection-molded part which partly is electrically conductive.

With reference to FIG. 2 it will be explained below how a corresponding motor vehicle control device 10 is manufactured or retrofitted.

First of all, there is provided a printed circuit board 34 on which at least one corresponding light source is provided, for example a search illumination light source 60 and/or a function light source 44, in order to backlight the switching symbols 16 or the function display surfaces 17. Subsequently, a trim carrier 64 is provided, which in the embodiment shown in FIG. 2 is formed by the light duct module 18. Alternatively, there can also be used the base module 36, as is shown in FIGS. 6 and 11.

Subsequently, a provided trim 12 is selected from a plurality of existing trims 12, on which the corresponding switching symbols 16 are present, which corresponds to the desired additional functions that have been chosen. The trim 12 then is coupled with the trim carrier 64 via the modular interface 39, wherein this is effected via the corresponding fastening elements 30 and the openings 32, so that the selected trim 12 is attached to the light duct module 18.

The light duct module 18, as explained already, includes the light ducts 22 which are associated to the light sources arranged on the printed circuit board 34, so that the correspondingly chosen switching symbols 16 can be backlit on the selected trim 12, in case they are meant to represent a search illumination 56 or a status of a function.

Subsequently, via the control and evaluation unit, in particular that of the printed circuit board 34, the corresponding sensors 28 are defined, which are associated to the switching symbols 16 present on the trim 12. This ensures that the motor vehicle control device 10 operates in the desired way, i.e. that to each existing switching symbol 16 the corresponding function also actually is associated. This can be effected in a simple way via a software update or the installation of a corresponding software.

In case a motor vehicle control device 10 already is in operation and further functions are desired subsequently, this can likewise be effected in a simple way in that the trim 12 is exchanged and a new trim 12 with correspondingly more switching symbols 16 is coupled with the light duct module 18.

Subsequently, the corresponding light ducts 22 or the sensors 28 associated to the light ducts 22 must be programmed via the control and evaluation unit, in particular that of the printed circuit board 34, in order to correspondingly enable the new switching functions which now are available through the new switching symbols 16.

In so far, it is possible that functions still can be enabled subsequently, in that the trim 12 is exchanged and the sensors 28 are enabled correspondingly via the control and evaluation unit.

In general, a flexibly usable motor vehicle control device 10 thus is created, which also is of compact construction, wherein the corresponding switching symbols 16 and function display surfaces 17 can be illuminated completely and in a homogeneous way.

The invention claimed is:

1. A motor vehicle control device for an interior space of a motor vehicle, comprising a trim and a printed circuit board, wherein the trim comprises a control surface on which at least one switching symbol to be actuated is shown, which can be backlit by a light source, wherein the light source is associated to a light duct which leads to the control surface, wherein the light emitted by the light source extends along the light duct that forms a passageway and backlights the at least one switching symbol to be actuated, wherein the light duct is formed on a light duct module formed separate from the trim and the printed circuit board, the light duct extends completely through a base body of the light duct module, and wherein the light duct module has at least one electrically conductive portion which also completely extends through the base body and comprises a sensor surface associated to the switching symbol, wherein the sensor surface encloses the light duct.

2. The motor vehicle control device (10) according to claim 1, wherein the printed circuit board (34) has a front side (46) directed to the control surface (14) and a rear side (48) opposite to the front side (46), wherein the light source (44) is arranged on the rear side (48) of the printed circuit board (34) which includes an associated opening (42) that forms the light duct (22).

3. The motor vehicle control device (10) according to claim 1, wherein the at least one sensor surface (26) has a sensor (28) associated thereto, which detects an approach to, touch and/or actuation of the associated switching symbol (16), wherein the sensor (28) is activatable.

4. The motor vehicle control device (10) according claim 1, wherein the trim (12) is exchangeably mounted on the light duct module (18) such that different trims (12) can be mounted on the light duct module (18) in case another functionality is desired.

5. The motor vehicle control device (10) according to claim 1, wherein the light duct (22) is formed such that the light is totally reflected on the inner surfaces.

6. The motor vehicle control device (10) according to claim 1, wherein on the control surface (14) function display surfaces (17) are provided, via which a status of an associated function can be indicated.

7. The motor vehicle control device (10) according to claim 1, wherein the motor vehicle control device (10) includes a search illumination (56) which comprises at least one search illumination light source (60) and an associated light guide (58).

8. The motor vehicle control device (10) according to claim 7, wherein the light guide (58) is formed such that the light passing through the light guide (58) is totally reflected on its boundary surfaces, wherein the light guide (58) includes exit surfaces (62) on which the light can exit.

9. The method according to claim 7, wherein the trim carrier (64) is formed by a light duct module (28) or a base module (36).

10. A method for manufacturing a motor vehicle control device, comprising the following steps:

providing a printed circuit board on which at least one light source is provided, providing a trim carrier of modular construction, selecting one of several replaceable alternative trims which can be coupled with the trim carrier of modular construction, wherein only one of the several replaceable alternative trims is coupled with the trim carrier at the same time, and mounting the selected trim on the trim carrier, wherein the printed circuit board or the trim carrier comprises at least one light duct associated to the light source;

wherein the light emitted by the light source extends along the light duct that forms a passageway and backlights at least one switching symbol to be actuated;

wherein the light duct is formed on a light duct module formed separate from the trim and the printed circuit board, the light duct extends completely through a base body of the light duct module and wherein the light duct module has at least one electrically conductive portion which also completely extends through the base body and comprises a sensor surface associated to the switching symbol, wherein the sensor surface encloses the light duct.

11. The method according to claim 10, wherein provided sensors (28) are enabled, which are associated to switching symbols (16) that are provided on a control surface (14) of the trim (12).

\* \* \* \* \*